United States Patent
Hancock

(10) Patent No.: US 8,012,299 B2
(45) Date of Patent: Sep. 6, 2011

(54) ASSEMBLY TOOL AND A METHOD OF MANUFACTURING A BLADE

(75) Inventor: Mark Hancock, Southampton Hampshire (GB)

(73) Assignee: Vestas Wind Systems A/S, Randers SV (DK)

(*) Notice: Subject to any disclaimer, the term of this patent is extended or adjusted under 35 U.S.C. 154(b) by 0 days.

(21) Appl. No.: 12/920,779

(22) PCT Filed: Mar. 5, 2009

(86) PCT No.: PCT/EP2009/052596
§ 371 (c)(1),
(2), (4) Date: Nov. 24, 2010

(87) PCT Pub. No.: WO2009/109619
PCT Pub. Date: Sep. 11, 2009

(65) Prior Publication Data
US 2011/0067795 A1    Mar. 24, 2011

Related U.S. Application Data

(60) Provisional application No. 61/033,883, filed on Mar. 5, 2008.

(30) Foreign Application Priority Data

Mar. 5, 2008 (DK) ................................. 2008 00328

(51) Int. Cl.
| | |
|---|---|
| B29C 65/00 | (2006.01) |
| B32B 37/00 | (2006.01) |
| B63H 1/06 | (2006.01) |
| B63H 5/125 | (2006.01) |
| B63H 1/26 | (2006.01) |
| B63H 7/02 | (2006.01) |
| B64C 11/12 | (2006.01) |
| B64C 11/28 | (2006.01) |
| B64C 27/50 | (2006.01) |
| B64C 11/16 | (2006.01) |
| B64C 27/46 | (2006.01) |
| F01D 5/00 | (2006.01) |
| F01D 5/14 | (2006.01) |
| F03B 3/12 | (2006.01) |
| F03B 7/00 | (2006.01) |
| F03D 11/02 | (2006.01) |

(52) U.S. Cl. ..... 156/292; 156/228; 416/226; 416/132 B; 29/889.7

(58) Field of Classification Search ..................... 156/60, 156/91, 92, 228, 242, 245, 285, 286, 292, 156/538, 539, 559, 560; 416/223 R, 226, 416/232, 233, 131, 132 R, 132 B; 269/37; 29/889, 889.7, 889.71, 889.72; 244/123.1, 244/123.7, 123.8, 123.9
See application file for complete search history.

(56) References Cited

U.S. PATENT DOCUMENTS 2,506,992 A * 5/1950 Bucher et al. ................. 416/226
(Continued)

FOREIGN PATENT DOCUMENTS

DE    199 62 454    7/2001
(Continued)

OTHER PUBLICATIONS

International Preliminary Report on Patentability dated Sep. 7, 2010 issued in corresponding application No. PCT/EP2009/052596.
(Continued)

*Primary Examiner* — Philip C Tucker
*Assistant Examiner* — Brian R Slawski
(74) *Attorney, Agent, or Firm* — Wood, Herron & Evan, L.L.P.

(57) ABSTRACT

The invention provides a method of manufacturing a wind turbine blade comprising a spar and at least one airfoil section, where both the spar and the airfoil section comprise an outer surface which forms part of an aerodynamically active surface of the blade. The method comprises steps of providing a support structure, placing the spar at the support structure, providing a clamp adapted to be fixed to the outer surface of both the spar and the airfoil section, arranging the airfoil section relative to the spar, fixing the clamp to the outer surface of the spar and the airfoil section, and assembling the at least one airfoil section an the spar by a process including adhesion.

15 Claims, 9 Drawing Sheets

U.S. PATENT DOCUMENTS

| | | | |
|---|---|---|---|
| 3,333,642 A * | 8/1967 | Kee | 416/226 |
| 4,316,701 A | 2/1982 | Scarpati et al. | |
| 4,732,542 A | 3/1988 | Hahn et al. | |
| 2006/0034971 A1 * | 2/2006 | Olsen et al. | 425/451.5 |

FOREIGN PATENT DOCUMENTS

| | | | |
|---|---|---|---|
| DE | 19962454 A1 * | 7/2001 | |
| DE | 10211357 A1 * | 9/2002 | |
| DK | 200300327 A * | 9/2004 | |
| EP | 1 316 400 | 6/2003 | |
| JP | 2000 179448 | 6/2000 | |
| JP | 2001 165033 | 6/2001 | |

OTHER PUBLICATIONS

Written Opinion dated Apr. 19, 2010 issued in corresponding application No. PCT/EP2009/052596.

* cited by examiner

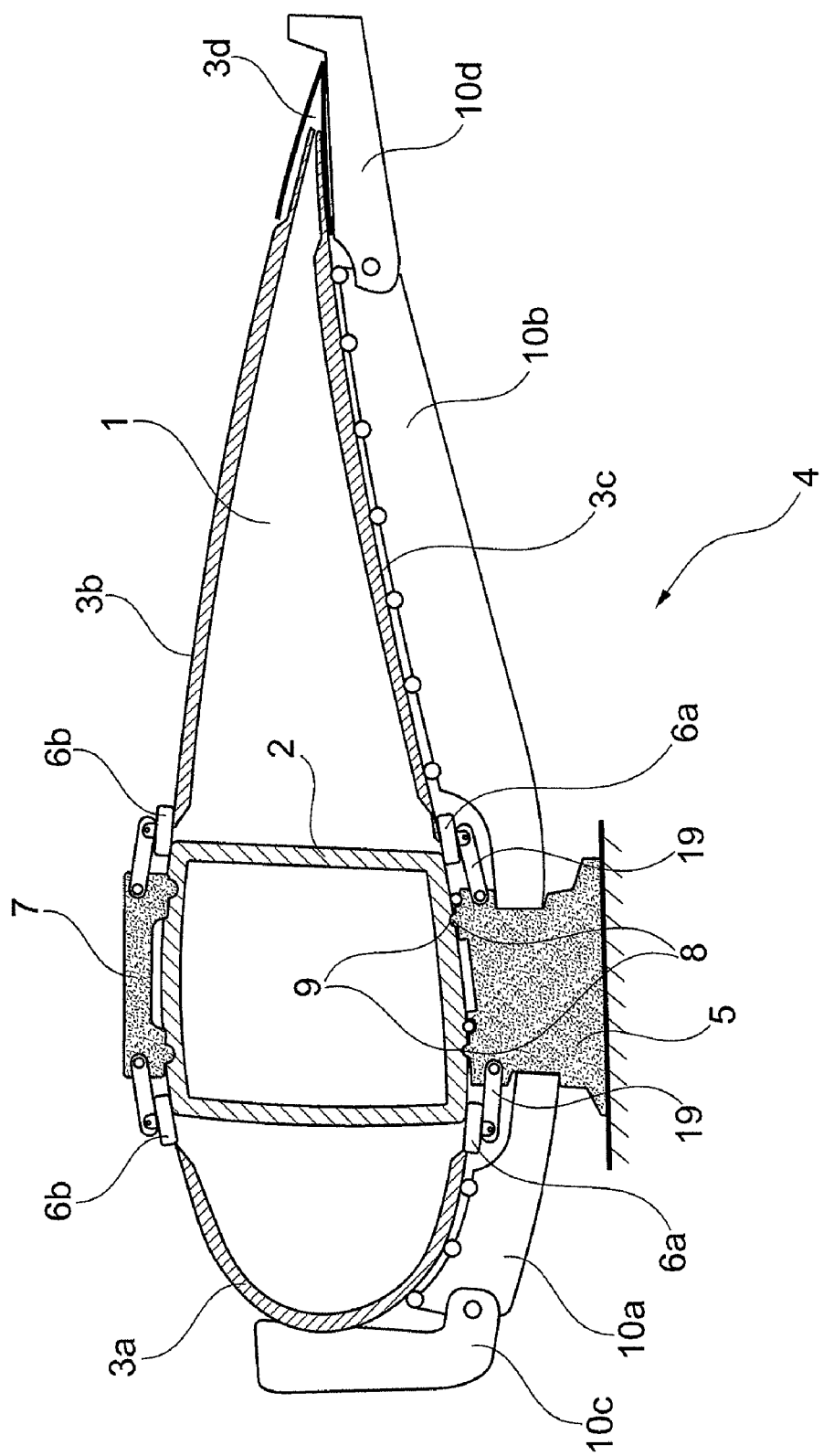

ASSEMBLY TOOL AND A METHOD OF MANUFACTURING A BLADE

PRIORITY CLAIM

This is a U.S. national stage of application No. PCT1EP2009/052596, filed on Mar. 5, 2009. Priority is claimed on the following applications: Denmark Application No. PA 2008 00328 Filed on Mar. 5, 2008 and U.S. Application No. 61/033,883 Filed on Mar. 5, 2008, the content of which are incorporated here by reference.

TECHNICAL FIELD

The present invention relates to a method of manufacturing a wind turbine blade comprising a spar and at least one airfoil section. Furthermore, the invention relates to a tool for use in assembling a spar and at least one airfoil section, and a clamp for fixing an airfoil section to a spar during manufacturing.

BACKGROUND OF THE INVENTION

Modern wind turbines comprise a plurality of wind turbine rotor blades, typically three blades, each blade today having a weight of up to 15 tons and a length of up to 55 meters.

Traditionally, a blade comprises two shell parts, one defining a windward side shell part and the other one defining a leeward side shell part. To reinforce such a blade a box-shaped, longitudinal and tubular element, i.e. a spar, can act as a reinforcing beam. The spar is located in the cavity between the two wind turbine shell parts and extends substantially throughout the shell cavity in order to increase the strength and stiffness of the wind turbine blade.

As the size of wind turbines and thus wind turbine blades are still growing, the production facilities and the transport means must be upgraded to handle blades of the required size. This also increases the demand on logistics and increases the associated costs.

SUMMARY OF THE INVENTION

It is an object of embodiments of the present invention to provide an improved method of manufacturing a wind turbine blade, and to provide a tool for use in assembling parts of a wind turbine blade.

In a first aspect, the invention provides a method of manufacturing a wind turbine blade comprising a spar and at least one airfoil section, where both the spar and the airfoil section comprise an outer surface which forms part of an aerodynamically active surface of the blade. The method comprises the steps of:
  providing a support structure;
  placing the spar at the support structure;
  providing a clamp adapted to be fixed to the outer surface of both the spar and the airfoil section;
  arranging the airfoil section relative to the spar;
  fixing the clamp to the outer surface of the spar and the airfoil section; and
  assembling the at least one airfoil section and the spar by a process including adhesion.

The wind turbine blade manufactured by the present method comprises a spar and at least one airfoil section. Both the spar and the at least one airfoil section comprise an outer surface which forms part of an aerodynamically active surface of the wind turbine blade. Thus, the spar is not completely encapsulated within very large turbine blade shell parts. Hence, the spar is easier transported from a manufacturing site to an assembly site for being assembled according to the method, compared to large blade shells or complete blades, and the airfoil sections are smaller than normal blade shells. The assembly site can be situated close to the place where the turbine blade it to be used.

By manufacturing the blade of different parts, these parts may be transported unassembled, thereby facilitating transport with the possibility of reducing costs.

The use of a support structure and clamps enables a precise positioning of the spar and the at least one airfoil section relative to each other, thereby ensuring the designed performance of the final blade.

Furthermore, if one part should be damaged during transport, a substitute part may be used instead of having to replace a full wind turbine blade.

The spar may be formed as a tubular element and it may constitute part of the longitudinal strength of the wind turbine blade, thus being part of the reinforcement of the blade. It should be understood, that by tubular element is in this connection meant a hollow element with an elongated shape. The shape may be non-uniform. The outer geometry may be of a rectangular shape, a partly circular shape, an oval shape or any other shape. The inner geometry may be different from the outer shape, thus defining a tubular element with a ring-shaped cross-section of an arbitrary shape.

In a cross section, the spar may be substantially rectangular, e.g. with rounded corners. The area of the cross section may decrease from the root end to the tip end along the length of the spar to have a spar which fits a wind turbine blade having a decreased size at the tip end compared to the root end. However, the width of the spar may increase locally to increase strength and stiffness of the spar locally. In a preferred embodiment, the spar may thus be approximately conical, i.e. it may have a base which is substantially circular and transforms into an approximately rectangular shape with rounded corners and with sides which taper towards each other.

As an example, the spar may have a length of approximately 45 metres, a maximum width of approximately 1.0 metres, and a maximum height of approximately 0.8 metres. Compared hereto the minimal width of the spar may be approximately 100 millimetres. It should be understood that this is only one example of a spar. Other spars being both smaller and larger may also be used depending of the wind turbine blade to be manufactured.

The spar may have been manufactured in one piece, or may have been assembled from at least two spar sections.

The support structure, at which the spar can be placed, may be a worktable, a plurality of trestles, or a similar supporting structure which can support the spar during manufacturing of the wind turbine blade.

To be able to assemble the spar and the at least one airfoil section, the airfoil section is arranged relative to the spar, e.g. at one of the sides of the spar either relative to an upper portion of the spar or relative to a lower portion of the spar.

A clamp is fixed to the outer surface of the spar and to the outer surface of the airfoil section. The clamp may be fixed to both the spar and the airfoil section after arranging them relative to each other, or may be fixed to one of them before arranging them relative to each other.

When having fixed the clamp to the outer surface of both the spar and the airfoil section, the two parts can be assembled by use of an adhesive. The method may thus comprise a step of applying an adhesive to at least one of the spar and the airfoil section. The adhesive may be added to at least one of the two parts before arranging them relative to each other. The assembly process may further include use of other means, such as screws, bolt and nut assemblies, snap locks, etc. These means may be combined with the use of an adhesive and may be combined with each other.

To finalise assembling of the spar and the airfoil section, the method may further comprise a step of curing said adhesive. The adhesive may be cured by the use of heat.

As the spar may be relatively long and compared hereto relatively thin, a spar may be slightly twisted or bended when arranged on the support structure. To ensure that the spar is correctly positioned before arranging the at least one airfoil section relative to the spar, the method may further comprise a step of aligning the spar relative to the support structure.

As the spar may be relatively long, it may be an advantage to be able to use a support structure which does not have a length corresponding to the full length of the spar. Consequently, the support structure may in one embodiment comprise a plurality of supporting posts. These supporting posts may be positioned adjacent to each other with a sufficient mutual distance to carry the spar.

The method may further comprise a step of aligning the supporting posts. This step may advantageously be carried out before placing the spar on the supporting posts.

In one embodiment, the supporting posts may be height adjustable. This may facilitate positioning of spars of different size, as the cross sectional area may be different for spars of different length. Especially, as the angle of tapering of the spar may not necessarily be the same for spars of different size.

The clamp may be fixed to the outer surface of the spar and the airfoil section by different means. The clamp may be fixed e.g. by magnetic forces, by the use of suction pressure, by bonding, by screws, rivets, or by other means. As an example, the step of fixing the clamp to the outer surface of the spar and the airfoil section may comprise a step of providing a pressure gradient between an elongated region in the clamp and an ambient pressure outside the elongated region to provide a clamping force. Consequently, the clamp may be connected to a suction device which may create a negative pressure gradient to fix the clamp.

Depending on the size of the blade to be manufactured and the size of the airfoil sections, the size of the clamp may vary. A typical clamp may have a length in the range of 3-10 meters.

To facilitate fixing of the clamp and to facilitate handling and thus assembling of the spar and the airfoil section, the pressure gradient may be provided in a region extending along a major part of the length of the airfoil section. In one embodiment the region extends along substantially the full length of the airfoil section.

As the wind turbine blade may be manufactured from a plurality of airfoil sections, it may be an advantage using a clamp comprising a plurality of elongated regions. Each elongated region may correspond to one airfoil section. However, one airfoil section may be fixed by the use of a plurality of elongated regions.

To facilitate fixing of the clamp to the outer surface of the spar and the airfoil section, the method may comprise a step of distributing the elongated regions in positions corresponding to clamping positions on the spar and the airfoil section, respectively. The clamping positions may be marked on the outer surface, e.g. by visual indication marks, e.g. color indications on the surface or indentations, protrusions, or other marks or combinations of different marks.

To facilitate manufacturing of a wind turbine blade comprising a plurality of airfoil sections, the method may comprise a step of arranging further airfoil sections prior to the step of curing the adhesive. Consequently, all joint comprising an adhesive may be cured in one process or in a few processes allowing for an optimised curing process.

To facilitate assembling of more than one airfoil section and the spar, the method may comprise a step of fixing a clamp to outer surfaces of two adjacent airfoil sections allowing for simultaneous handling of two airfoil sections. In one embodiment, the clamp can be fixed to outer surfaces of even more airfoil sections.

The method may further comprise a step of fixing the outer surface of the spar to the outer surface of an airfoil section by an additional clamp. The clamp and the additional clamp may be fixed to surfaces on opposite sides of the spar. As an example, one of the clamp and the additional clamp may be fixed to the downwardly facing surface a spar placed on the support structure whereas the other one may be fixed to the upwardly facing surface hereof.

To facilitate aligning of the spar and the airfoil section, at least one of the spar and the airfoil section may comprise blade alignment markings. Furthermore, the blade alignment markings may be combined with support alignment markings facilitating alignment with at least one of support structure and the clamp. Consequently, it may be an advantage if at least one of the support structure and the clamp comprises support alignment markings corresponding to the blade alignment markings.

In one embodiment, the blade alignment markings comprise indentations and the support alignment markings comprise protrusions. These protrusions are arranged for engagement with the indentations. In an alternative embodiment, the blade alignment markings comprise protrusions, whereas the support alignment markings comprise indentations. Other corresponding markings facilitating alignment may be use in other embodiments.

In a second aspect, the invention provides a tool for use in assembling a spar and at least one airfoil section of a blade for a wind turbine, where both the airfoil section and the spar comprise an outer surface which forms part of an aerodynamically active surface of the blade, the tool comprising a support structure for holding the spar, and a clamp adapted to be fixed to the outer surface of both the spar and the airfoil section.

The tool may be used when manufacturing a wind turbine blade according to the first aspect of the invention. Thus, it should be understood that the steps of the first aspect of the invention may also be applicable in connection with the tool of the second aspect of the invention.

The clamp may comprise an elongated body element with an elongated clamp surface in which at least one elongated clamp element is formed, each clamp element facilitating fixing to the outer surface of one of the airfoil section and spar.

The elongated clamp surface may have a shape facilitating fixing of the clamp to the outer surface of the airfoil section and the outer surface of the spar. The elongated clamp element may constitute a major part of the clamp surface to ensure a large fixing area.

An elongated shape of the clamp element may further ensure a large fixing area, as both the spar and the airfoil section in most embodiments have an elongated shape.

The elongated clamp element may comprise one or more individual vacuum chambers. And each clamp element may thus comprise a vacuum clamp structure facilitating fixing to the outer surface of one of the airfoil section and the spar by use of a pressure gradient between an elongated region and an ambient pressure outside the elongated region.

By vacuum it in this connection understood a pressure difference between any low pressures in a vacuum chamber and a relatively higher pressure outside the chamber. I.e. a vacuum chamber may have a pressure of any value below the value of the pressure outside the chamber.

To ensure a sufficient pressure difference, the elongated region and the ambience may be separated e.g. by a soft sealing lip or other sealing means.

In an alternative embodiment, each clamp element may comprise an element adapted for magnetic interaction with a corresponding element in one of the spar and the airfoil section. To enable magnetic interaction, at least one magnetic metal strip may be inserted in the spar and/or in the at least one airfoil section during manufacturing hereof allowing for magnetic interaction with a magnet in the clamp element.

A further alternative is to use a clamp incorporating means for mechanical fixing of the spar and the at least one airfoil section before assembling them by a process including adhesion. Examples of mechanical fixing may included the use of screws, rivets, and the like. The mechanical fixing may be temporary as the magnetic forces and the suction pressure, or may alternatively be permanent.

In a further alternative, magnetic interaction and/or pressure difference and/or means for mechanical fixing may be combined in the clamp element.

When arranging the support structure and preparing the clamp for handling of a spar and at least one airfoil section, it may be an advantage if the clamp is connected to the support structure. Consequently, the elongated body element may be movably attached to the support structure. This may further facilitate fixing of the clamp to the outer surface of the spar and the airfoil section after having arranged the airfoil section relative to the spar.

As the airfoil section and the spar are assembled by the use of an adhesive, it may be an advantage to be able to heat the adhesive to cure it. Consequently, the clamp may comprise a heating structure facilitating curing of an adhesive provided between the spar and the airfoil section. As an example, the heating structure may comprise electrically heated wires.

The support structure may comprise a worktable or a plurality of supporting posts. Furthermore, the support structure may comprise an upper part with a seat for carrying the spar and a hinge structure facilitating tilting of the upper part relative to a lower part of the support structure to enable reorientation of a spar being supported by the support structure.

When having placed the spar on the support structure, the part of the spar forming part of the lee side of the blade may as an example face upwards and the part forming part of the wind side may face downwards. Consequently, the side of the spar facing the trailing edge of the blade may face to the right and the side of the spar facing the leading edge may face to the left, or opposite.

When being able to tilt the upper part of the support structure carrying the spar and thus re-orientate the spar, it is possible to turn the part of the spar facing the leading edge upwards and subsequently to lower an airfoil section forming the leading edge or forming part of the leading edge down towards the spar e.g. by a crane, to arrange this airfoil section relative to the spar, to fix the clamp to the outer surface of the spar and the airfoil section and to assemble the airfoil section and the spar.

Finally, the spar may be turned back to its initial position for mounting of the one or more airfoil sections to the other side of the spar.

If the support structure comprises a plurality of supporting posts, these posts may comprise an upper part with a seat for carrying the spar and a hinge structure facilitating tilting of the upper part relative to a lower part of the support structure to enable reorientation of a spar being supported by the support structure. The supporting posts may be adapted to hold the spar so that it is rotated uniformly around its centre line, thereby ensuring a uniform relative, rotational position of the spar along the length of the spar. As an example, this may be facilitated by using an external reference, e.g. provided by a laser.

In an alternative embodiment, in which the upper part of the support structure cannot be re-orientated, the airfoil sections forming the leading edge and the trailing edge may be mounted simultaneously.

The upper support structure may comprise a support clamp surface facilitating fixing to the outer surface of the spar. The support clamp may comprise means for fixing of the support clamp e.g. by magnetic forces, by suction pressure, or by bonding.

If the support structure comprises a plurality of supporting posts, it may be an advantage to align these posts before placing the spar on the support structure. The tool may comprise an alignment tool facilitating alignment of the supporting posts. The alignment tool may in one embodiment comprise a laser.

As the airfoil sections may be large, it may be difficult to handle them and to arrange them correctly relative to the spar. Therefore, the tool may further comprise at least one supporting arm being connected to the support structure and adapted to support at least one airfoil section.

The tool may further comprise an additional clamp which may be adapted to be fixed to the outer surface of the spar and to the outer surface of an airfoil section. The clamp and the additional clamp may be fixed to surfaces on opposite sides of the spar.

In a third aspect, the invention provides a clamp for fixing an airfoil section to a spar, the clamp comprising an elongated body element with an elongated clamp surface in which at least one elongated clamp elements are formed, each clamp element facilitating fixing to an outer surface of one of the airfoil section and spar.

The clamp may be used when manufacturing a wind turbine blade according to the first aspect of the invention and may form part of the tool of the second aspect of the invention. Thus, it should be understood that the steps of the first aspect of the invention and the features of the second aspects of the invention may also be applicable in connection with the clamp of the third aspect of the invention.

Each clamp element may comprise a vacuum clamp structure facilitating fixing to the outer surface of one of the airfoil section and spar by use of a pressure gradient between an elongated region and an ambient pressure outside the elongated region. To ensure a sufficient pressure difference, the elongated region and the ambient pressure may be separated e.g. by a soft sealing lip or other sealing means.

The elongated body may be movably attached to a main body of the clamp facilitating non-simultaneous fixing to the spar and the airfoil section. In one embodiment, the main body of the clamp may comprise an elongated body clamp element facilitating fixing to the outer surface of the spar, whereas the movably attached elongated body may facilitate fixing to the airfoil section. After having fixed the body clamp element to the spar, the clamp element may be fixed to an airfoil section being arranged relative to the spar.

The clamp may comprise a heating structure facilitating curing of an adhesive provided between the spar and the airfoil section.

In a fourth aspect, the invention provides a blade for a wind turbine comprising a spar and at least one airfoil section, the blade being manufactured by use of a tool according to the second aspect of the invention. Furthermore, the clamp of third aspect of the invention may be used.

It should be understood, that one or more steps of the method of the first aspect of the invention may be applicable when manufacturing the wind turbine of the fourth aspect of the invention.

BRIEF DESCRIPTION OF THE DRAWINGS

Embodiments of the invention will now be further described with reference to the drawings, in which:

FIG. 3 illustrates an embodiment of a tool for use in assembling a spar and at least one airfoil section;

DETAILED DESCRIPTION OF THE DRAWINGS

Figure 1:
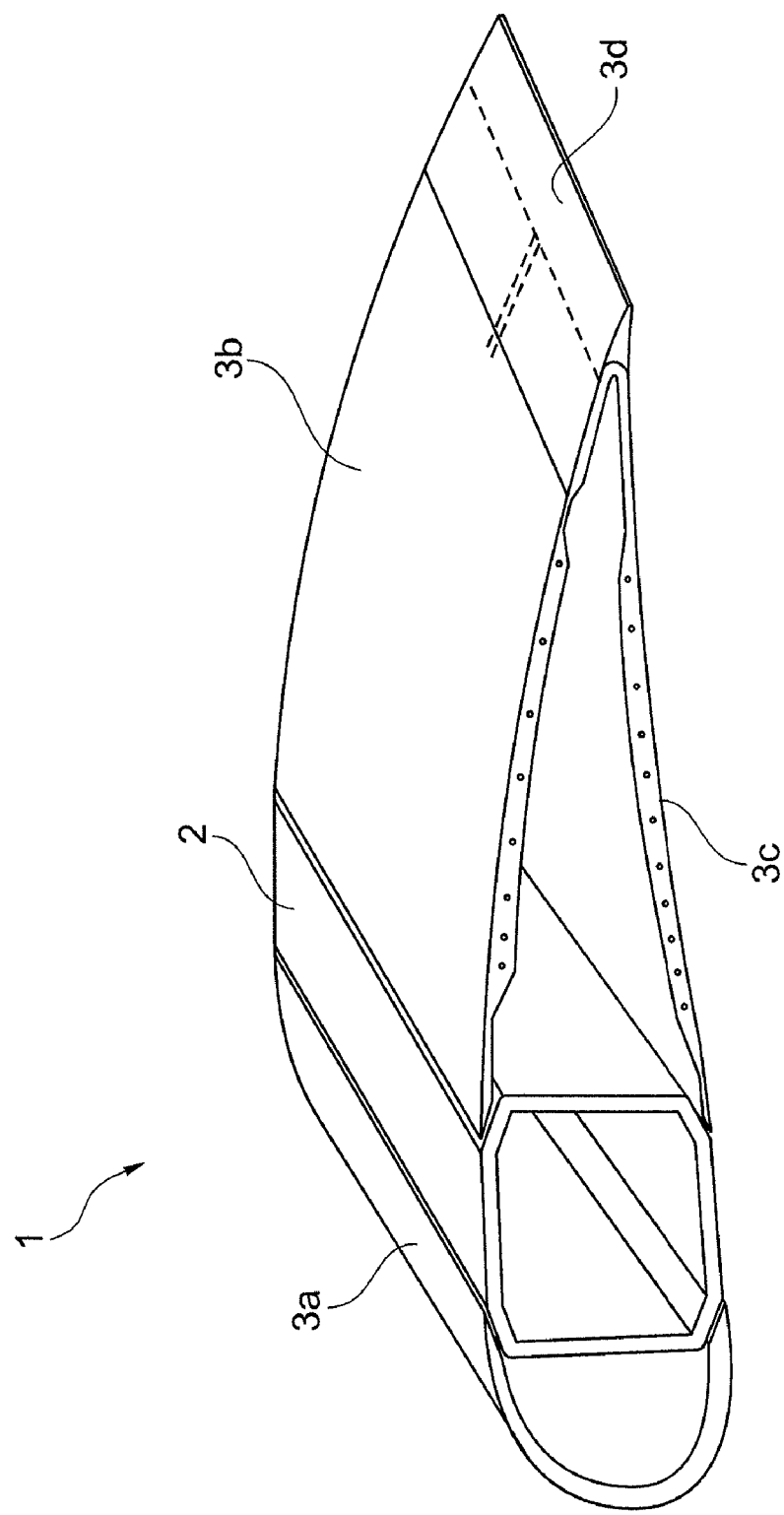
FIG. 1 illustrates a cross-section of a modular wind turbine blade manufactured by the first aspect of the invention.

FIG. 1 illustrates a cross-section of a part of a modular wind turbine blade 1. The blade 1 comprises a spar 2 and four airfoil sections 3a, 3b, 3c, 3d. Both the spar 2 and the airfoil sections 3 comprise an outer surface which forms part of the aerodynamically active surface of the blade 1.

Even though only a part of the spar 2 is illustrated, it should be understood, that the spar 2 extends through out substantially the length of the blade 1 and may thus be in one piece before assembling the spar 2 and the at least one airfoil section 3. The spar 2 may however have been assembled of at least two spar sections.

In the illustrated embodiment, one airfoil section 3a forms part of the leading edge of the blade 1, whereas the other airfoil sections 3b, 3c, 3d form part of the trailing edge of the blade 1.

In the illustrated embodiment of part of a blade 1, the airfoil sections 3a, 3b, 3c, 3d have equal length. It should however be understood, that the length of the airfoil sections 3 may not necessarily be equal.

Figure 2:
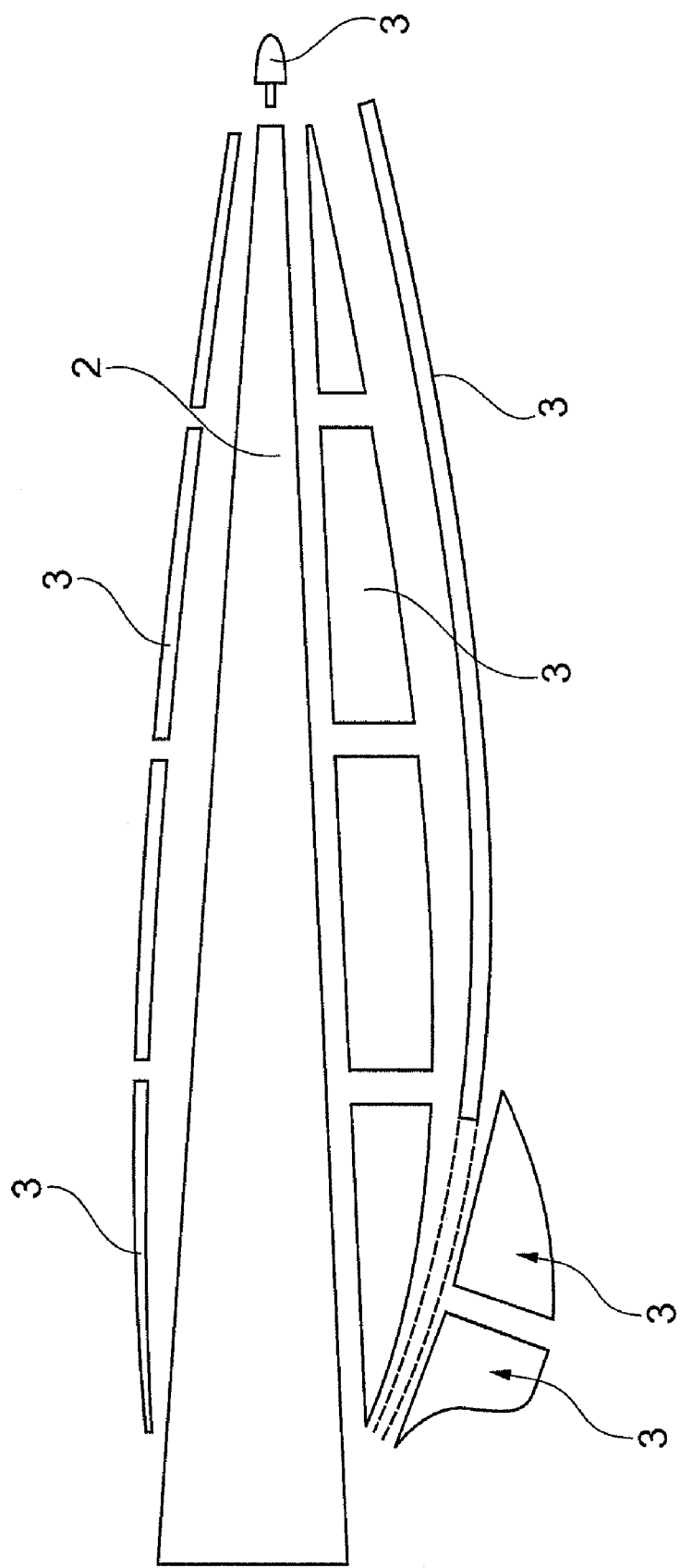
FIG. 2 illustrates an embodiment of an un-assembled modular wind turbine blade.

FIG. 2 illustrates an embodiment of an un-assembled wind turbine blade 1 comprising a spar 2 and a plurality of airfoil sections 3.

FIG. 3 illustrates an embodiment of a tool 4 for use in assembling a spar 2 and at least one airfoil section 3. The tool 4 comprises a support structure 5 and a number of clamps 6. The clamps 6 are adapted to be fixed to the outer surface of both the spar 2 and the airfoil section 3. The lower clamps 6a adapted to be fixed to the downwardly facing outer surface of the spar 2 and the airfoil section 3 are hinged to the support structure 5, whereas the upper clamps 6b adapted to be fixed to the upwardly facing outer surface of the spar 2 and the airfoil section 3 are hinged to a main body 7.

The support structure 5 comprises support alignment markings 8 formed as protrusions. Corresponding hereto, the spar 2 comprises blade alignment markings 9 formed as small indentations in the outer surface of the spar 2. The alignment marking 8, 9 facilitate positioning of the spar 2 at the support structure 5.

The tool 4 comprises two supporting arms 10a, 10b being connected to the support structure 5. The supporting arms 10a, 10b are adapted to support at least one airfoil section 3.

In the illustrated embodiment, the supporting arm 10a comprises a secondary supporting arm 10c which is hinged to the supporting arm 10a. When placing the airfoil section 3a, the secondary supporting arm 10c can be in an un-activated position, in which it is turned downwards (this configuration is not shown). Subsequently, the secondary supporting arm 10c can be turned to a position in which it presses the airfoil section 3a towards the spar (as illustrated).

Likewise, the supporting arm 10b comprises a secondary supporting arm 10d which is hinged to the supporting arm 10b.

Figure 4A:
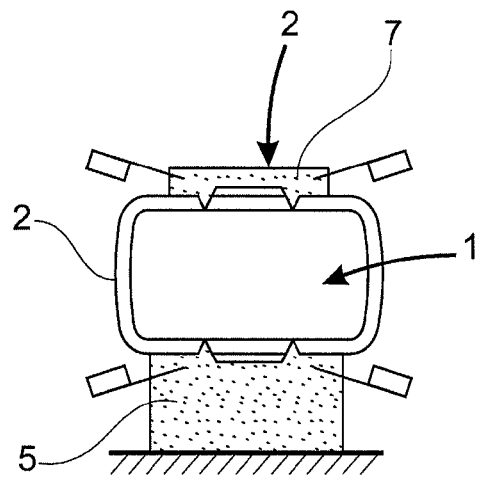
FIGS. 4a-4c illustrate a typical assembly order.
Figure 4B:
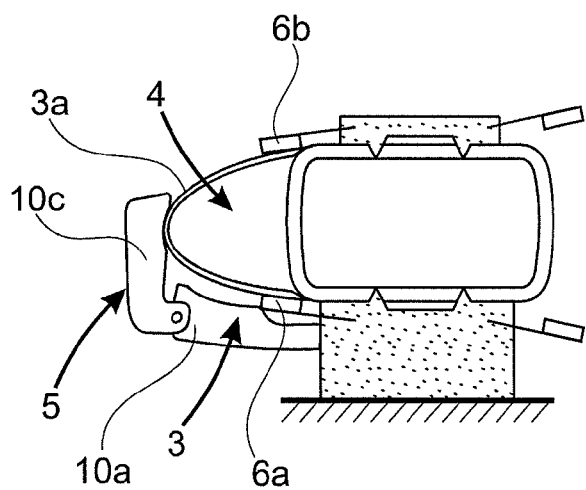
Figure 4C:
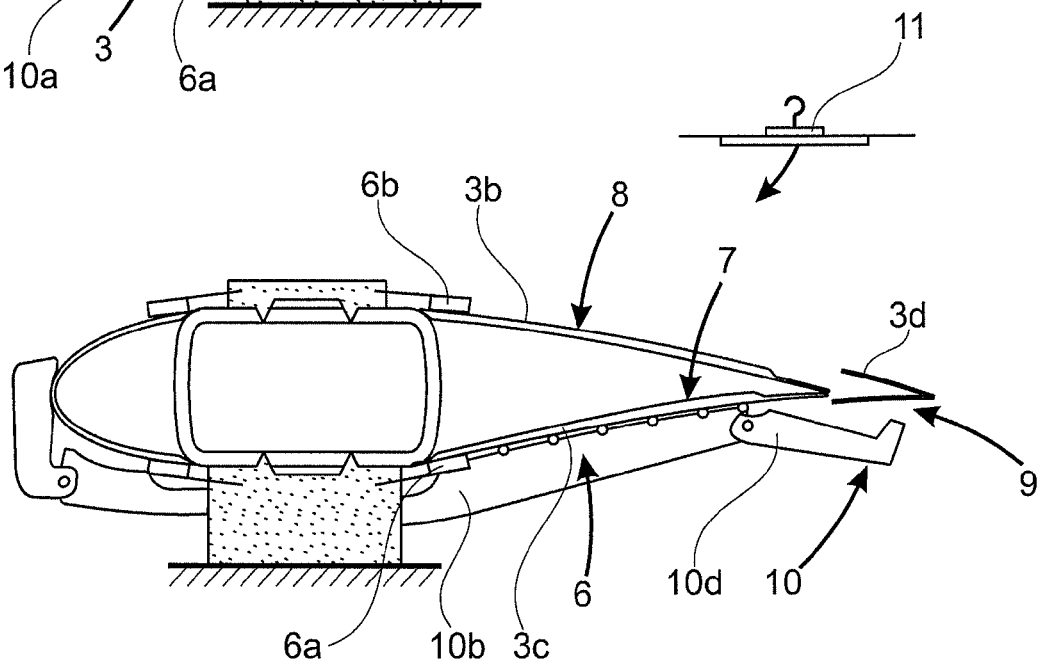

FIGS. 4a-4c illustrate some of the steps of a typical assembly order when manufacturing a wind turbine blade 1 by modules:
1) placing the spar 2 at the support structure 5,
2) placing a main body 7 on the upwardly facing side of the spar 2,
3) turning a supporting arm 10a into position relative to the support structure 5,
4) arranging an airfoil section 3a relative to the spar 2, and fixing the lower and upper clamps 6a, 6b to the outer surface of the airfoil section 3a and to the spar 2,
5) turning the secondary supporting arm 10c upwardly to achieve a pressure on the airfoil section 3a towards the spar 2,
6) turning a supporting arm 10b into position relative to the support structure 5,
7) arranging an airfoil section 3c relative to the spar 2, and fixing the lower clamp 6a to the outer surface of the airfoil section 3c and to the spar 2,
8) arranging an airfoil section 3b relative to the spar 2 by the use of a crane 11, and fixing the upper clamp 6b to the outer surface of the airfoil section 3b and to the spar 2,
9) arranging an airfoil section 3d relative to the airfoil sections 3b, 3c, and
10) turning the secondary supporting arm 10d upwardly to support the airfoil section 3d.

Figure 5:
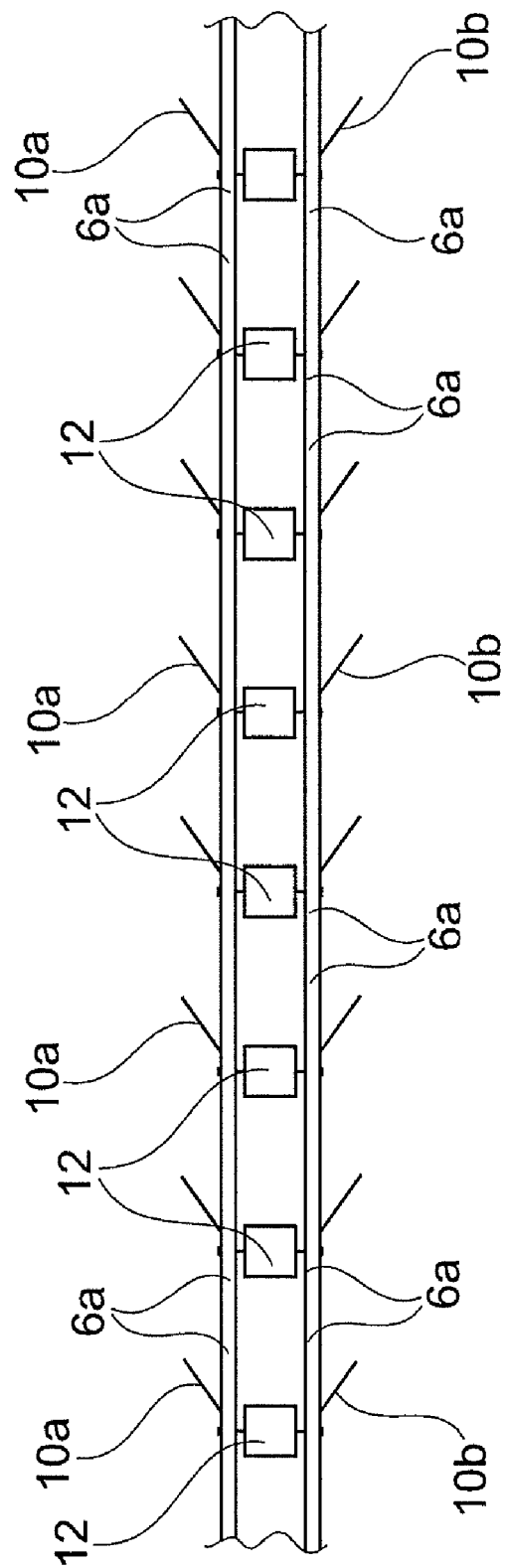
FIG. 5 illustrates a plan view of a support structure.

In the embodiment illustrated in FIG. 5, the support structure 5 comprises a plurality of supporting posts 12. The supporting posts 12 with clamps 6 and supporting arms 101, 10b are seen from above.

Figure 6A:
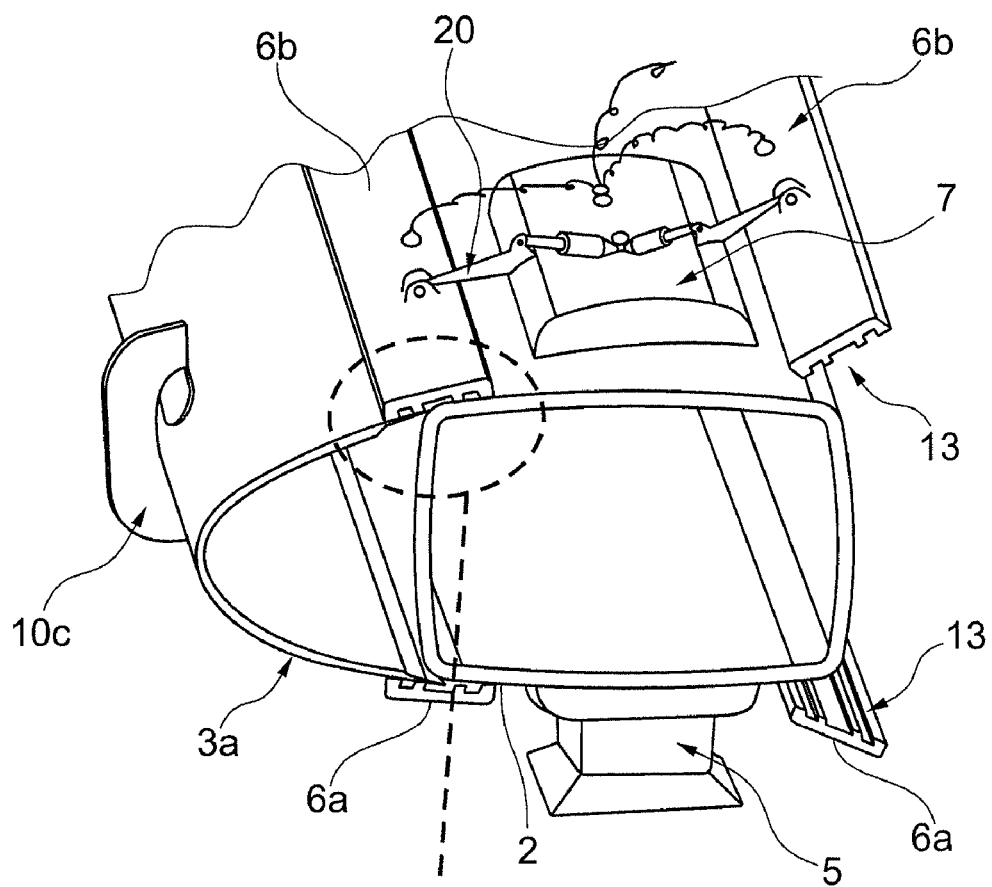
FIGS. 6a and 6b illustrate details of the tool of FIG. 3.
Figure 6B:
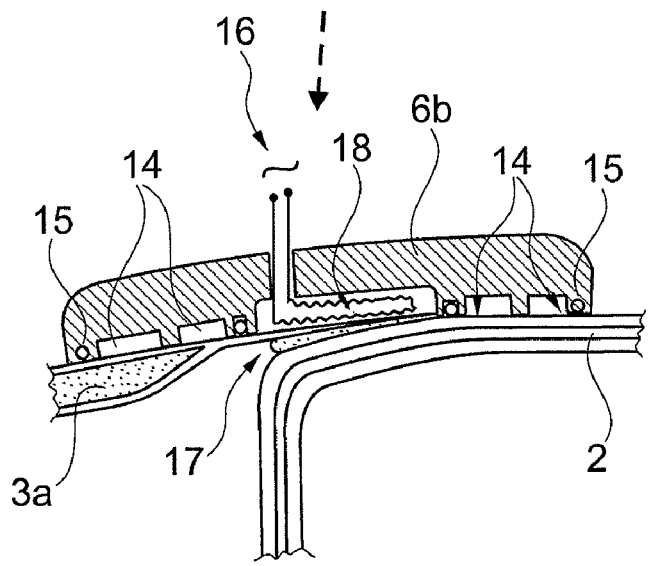

FIGS. 6a and 6b illustrate details of the tool 4 illustrated in FIG. 3, FIG. 6b illustrating an enlarged part of FIG. 6a.

As illustrated the clamps 6 comprise an elongated body element with an elongated clamp surface 13. In each of the clamp surfaces 13, four elongated clamp elements 14 are formed as individual vacuum chambers. Each of the clamp elements 14 facilitates fixing of the clamp 6 to the outer surface of at least one of the airfoil section 3 and the spar 2 by use of a pressure gradient between an elongated region of the airfoil section 3 and/or the spar 2.

To ensure a sufficient pressure difference, the elongated region and the ambient pressure is separated by a soft sealing lip 15.

The clamp 6 comprises a heating structure 16 facilitating curing of an adhesive 17 provided between the spar 2 and the airfoil section 3. The heating structure 16 comprises electrically heated wires 18.

The lower clamps 6a are hinged to the support structure 5 by hinges 19 (see FIG. 3) and the upper clamps 6b are hinged to the main body 7 by hinges 20.

Figure 7A:
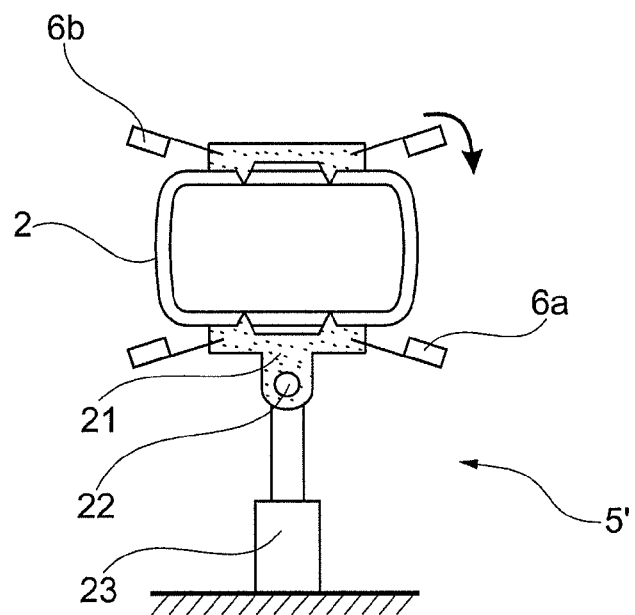
FIGS. 7a and 7b illustrate an alternative embodiment of a support structure.
Figure 7B:
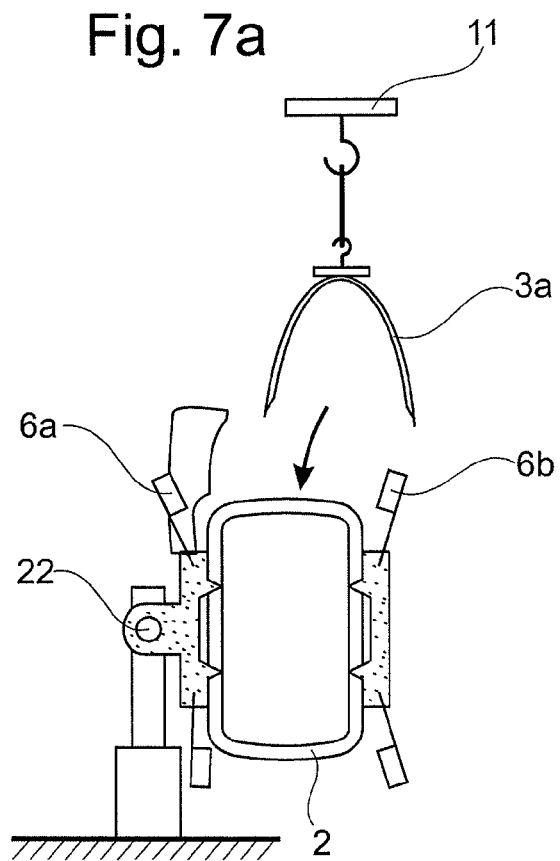

FIGS. 7a and 7b illustrate an alternative embodiment of a support structure 5'. The support structure 5' comprises an upper part 21 with a seat for carrying the spar and a hinge structure 22 facilitating tilting of the upper part 21 relative to a lower part 23 of the support structure 5' to enable reorientation of a spar 2 being supported by the support structure 5'.

When having placed the spar 2 on the support structure 5', the part of the spar 2 forming part of the lee side of the blade may as an example face upwards and the spar part forming part of the wind side may face downwards. Consequently, the side of the spar 2 facing the trailing edge of the blade may face to the right and the side of the spar 2 facing the leading edge may face to the left.

When being able to tilt the upper part 21 of the support structure 5' carrying the spar 2 and thus re-orientate the spar 2, it is possible to turn the part of the spar 2 facing the leading edge upwards and subsequent lower an airfoil section 3a forming the leading edge down towards the spar 2 by a crane 11, arrange this airfoil section 3a relative to the spar 2, fix the lower and upper clamps 6a, 6b to the outer surface the spar 2 and the airfoil section 3a, and assemble the airfoil section 3a and the spar 2.

Finally, the spar 2 is turned back to its initial position for mounting of the one or more airfoil sections 3 to the opposite side of the spar 2.

Figure 8:
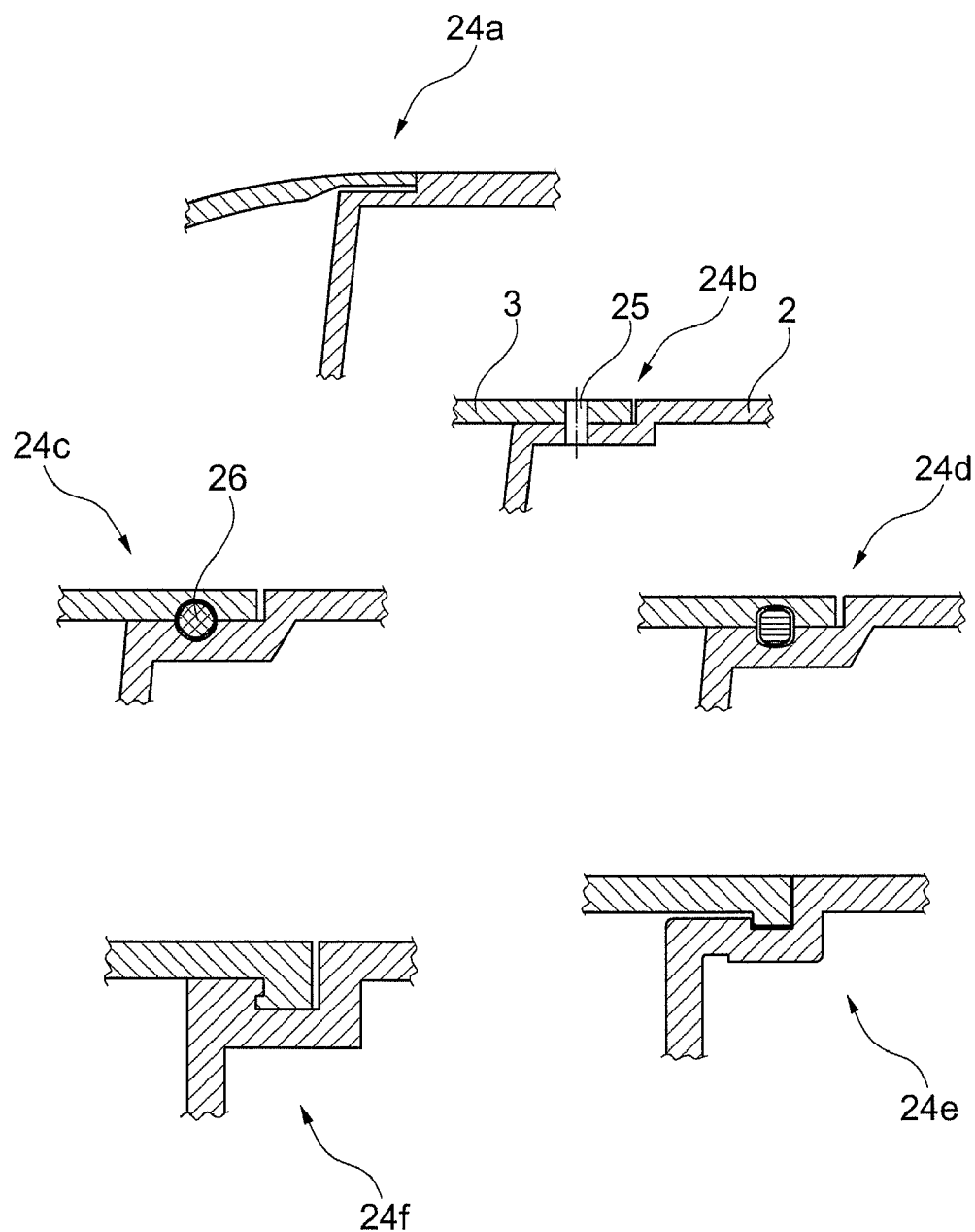
FIG. 8 illustrates different embodiments of assembly joints for a modular wind turbine blade.

FIG. 8 illustrates different embodiments of assembly joints 24 for a modular wind turbine blade. The assembly joints 24 are especially well suited for assembling of longitudinal joint, i.e. joints between the spar 2 and an airfoil section 3 and between adjacent airfoil sections 3 which joints are substantially parallel to the length of the spar 2. Each of the joints 24 comprises at least an adhesive which is not shown in FIG. 8.

The joint 24a comprises only a cured adhesive.

The joint 24b comprises an aperture 25 through both the spar 2 and the airfoil section 3 through which aperture 25 a bolt, a screw, a rivet, or the like is to be positioned.

The joint 24c comprises a cavity in which a cylinder 26 is bonded to facilitate a larger bond surface of this joint.

The joints 24d, 24e, 24f illustrated three different embodiments of snap lock joints.

Figure 9:
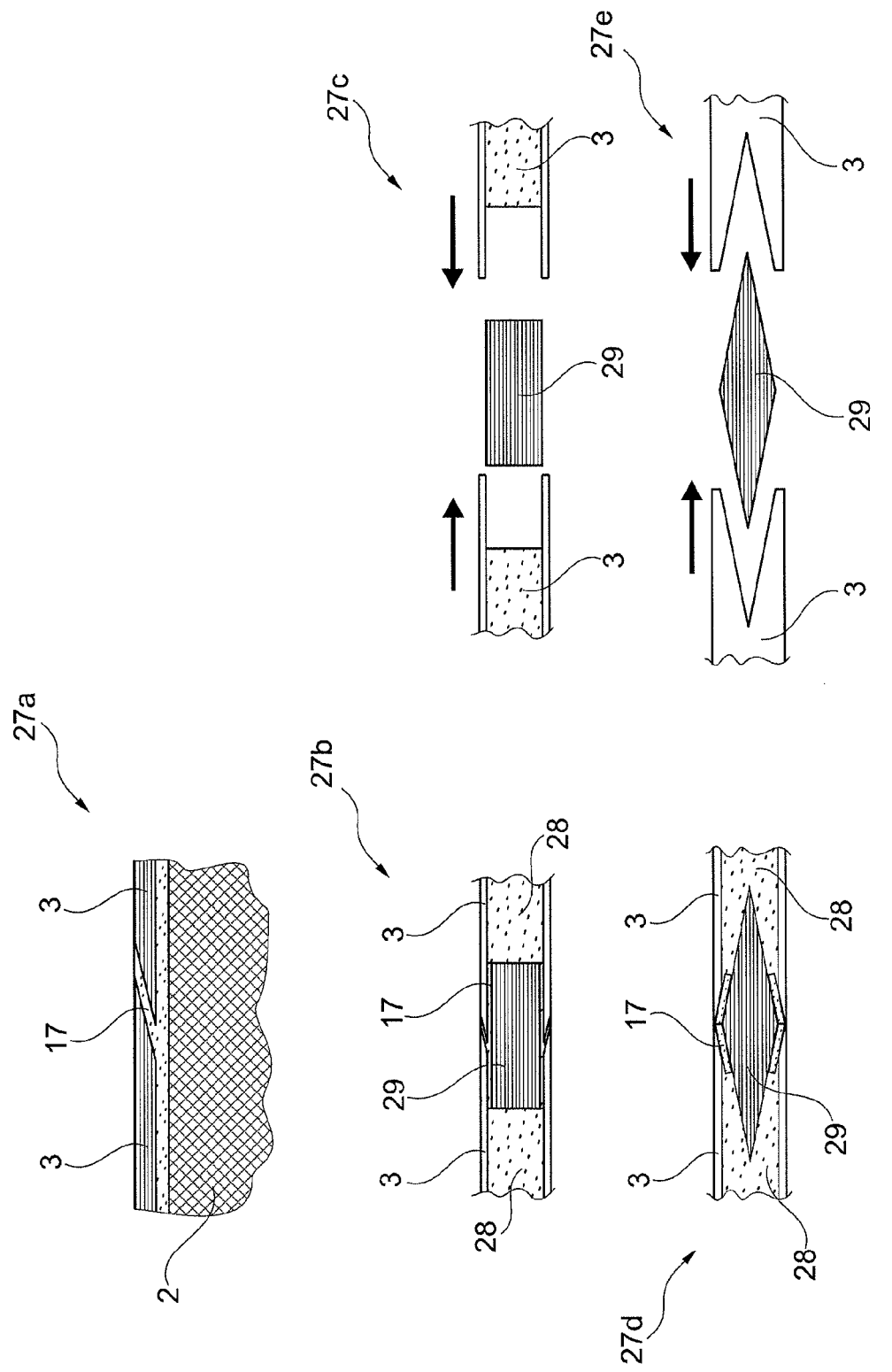
FIG. 9 illustrates alternative assembly joints.

FIG. 9 illustrates different alternative embodiments of assembly joints 27 for a modular wind turbine blade. The assembly joints 27 are especially well suited for assembling of transversal joint, i.e. joints between adjacent airfoil sections 3 which joints are substantially perpendicular to the length of the spar 2.

The joint 27a is a joint between the two adjacent airfoil sections 3. The airfoil sections 3 have tapered end portions to ensure overlay of material when bonding the airfoil sections 3 together by an adhesive 17.

The joints 27b, 27c, 27c, 27d are all sandwich panel joints in which two end portions of two adjacent airfoil sections 3 are joined by butt joints.

The joint 27b comprises a light core 28 between two opposite sides of an airfoil section 3. When joining two such airfoil sections 3, the light core 28 is substituted by a load carrying dense core 29 at the joint. Furthermore, the joint 27b comprises an adhesive 17.

The joint 27c is similar to the joint 27b except for the fact, that this joint does not comprise a light core. Instead the airfoil section material is through-going.

The joint 27d is equal to the joint 27b except for the geometry. The joint 27e is likewise equal to the joint 27c except for the geometry.

The invention claimed is:

1. A method of manufacturing a wind turbine blade comprising a spar and at least one airfoil section, where both the spar and the airfoil section comprise an outer surface which forms part of an aerodynamically active surface of the blade, the method comprises the steps of:
   providing a support structure;
   placing the spar at the support structure;
   providing a clamp adapted to be fixed to the outer surface of both the spar and the airfoil section;
   arranging the airfoil section relative to the spar;
   fixing the clamp to the outer surface of the spar and the airfoil section; and
   assembling the at least one airfoil section and the spar by a process including adhesion.

2. The method according to claim 1, further comprising a step of aligning the spar relative to the support structure.

3. The method according to claim 1, wherein the step of fixing the clamp to the outer surface of the spar and the airfoil section comprises a step of providing a pressure gradient between an elongated region in the clamp and an ambient pressure outside the elongated region to provide a clamping force.

4. The method according to claim 3, wherein the pressure gradient is provided in a region extending along a major part of the length of the airfoil section.

5. The method according to claim 1, wherein the clamp comprises a plurality of elongated regions, the method comprising a step of distributing the regions in positions corresponding to clamping positions on the spar and the airfoil section, respectively.

6. The method according to claim 1, further comprising a step of applying an adhesive to at least one of the spar and the airfoil section and a step of curing said adhesive.

7. The method according to claim 6, further comprising a step of arranging further airfoil sections prior to the step of curing said adhesive.

8. The method according to claim 1, further comprising a step of fixing a clamp to outer surfaces of two adjacent airfoil sections.

9. The method according to claim 1, further comprising a step of fixing the outer surface of the spar to the outer surface of an airfoil section by an additional clamp.

10. The method according to claim 9, wherein the clamp and the additional clamp are fixed to surfaces on opposite sides of the spar.

11. The method according to claim 1, wherein the support structure comprises a plurality of supporting posts.

12. The method according to claim 11, further comprising a step of aligning the supporting posts.

13. The method according to claim 1, wherein at least one of the spar and the airfoil section comprises blade alignment markings.

14. The method according to claim 13, wherein at least one of the support structure and the clamp comprises support alignment markings corresponding to blade alignment markings.

15. The method according to claim 14, wherein the blade alignment markings comprise indentations and the support alignment markings comprise protrusions, and where the protrusions are arranged for engagement with the indentations.

* * * * *